United States Patent
Kinnell

(10) Patent No.: US 8,863,579 B2
(45) Date of Patent: Oct. 21, 2014

(54) RESONANT SENSOR

(75) Inventor: Peter Ken Kinnell, Leicestershire (GB)

(73) Assignee: GE Infrastructure Sensing, Inc., Billerica, MA (US)

( * ) Notice: Subject to any disclaimer, the term of this patent is extended or adjusted under 35 U.S.C. 154(b) by 416 days.

(21) Appl. No.: 13/321,191

(22) PCT Filed: May 13, 2010

(86) PCT No.: PCT/GB2010/050783
§ 371 (c)(1),
(2), (4) Date: Nov. 18, 2011

(87) PCT Pub. No.: WO2010/133861
PCT Pub. Date: Nov. 25, 2010

(65) Prior Publication Data
US 2012/0060617 A1    Mar. 15, 2012

(30) Foreign Application Priority Data
May 21, 2009   (GB) .................................. 0908794.1

(51) Int. Cl.
*G01L 11/00*   (2006.01)
*G01L 9/00*    (2006.01)

(52) U.S. Cl.
CPC ............. *G01L 9/0013* (2013.01); *G01L 9/0022* (2013.01)
USPC .................................. 73/704; 73/702; 73/715

(58) Field of Classification Search
None
See application file for complete search history.

(56) References Cited

U.S. PATENT DOCUMENTS

| | | | | |
|---|---|---|---|---|
| 5,188,983 A | * | 2/1993 | Guckel et al. | 438/53 |
| 5,760,305 A | * | 6/1998 | Greiff | 73/514.15 |
| 5,962,788 A | * | 10/1999 | Fawcett | 73/514.36 |
| 6,546,801 B2 | * | 4/2003 | Orsier et al. | 73/514.38 |
| 6,632,698 B2 | * | 10/2003 | Ives | 438/52 |
| 7,490,519 B2 | * | 2/2009 | Subramanian et al. | 73/716 |

(Continued)

FOREIGN PATENT DOCUMENTS

| | | |
|---|---|---|
| EP | 0030741 A2 | 6/1981 |
| EP | 0244086 A2 | 11/1987 |

(Continued)

OTHER PUBLICATIONS

International Search Report dated Jul. 23, 2010 which was issued in connection with the PCT Application No. GB10/050783 which was filed on May 13, 2010.

(Continued)

*Primary Examiner* — Lisa Caputo
*Assistant Examiner* — Jermaine Jenkins
(74) *Attorney, Agent, or Firm* — GE Global Patent Operation; Mark A. Conklin

(57) ABSTRACT

A resonant sensor is disclosed which may be arranged to measure the pressure of a fluid. The resonant sensor comprises a diaphragm which may be exposed to a fluid; two supports provided on the diaphragm and a resonator having at least two beams with each beam being suspended between the two supports. The ends of each beam are attached to a corresponding support at more than one point. By attaching each end of the beams to a support at more than one point, the moments and reaction forces to which the support is subjected may be balanced so that distortion of the support and diaphragm due to vibration of the resonator beams is reduced. Consequently, the resonant sensor is able to provide more precise measurements.

16 Claims, 4 Drawing Sheets

(56) References Cited

U.S. PATENT DOCUMENTS

| | | | |
|---|---|---|---|
| 8,141,428 B2 * | 3/2012 | Lohr et al. | 73/703 |
| 8,497,672 B2 * | 7/2013 | Kawakubo et al. | 324/162 |
| 2005/0279175 A1 | 12/2005 | Arai et al. | |

FOREIGN PATENT DOCUMENTS

| | | |
|---|---|---|
| EP | 0855583 A2 | 7/1998 |
| GB | 2189601 A | 10/1987 |
| JP | 2009068882 A | 9/2007 |

OTHER PUBLICATIONS

GB Search Report dated Oct. 1, 2009 which was issued in connection with GB Application No. 0908794.1 which was filed on May 21, 2009.

Greenwood J. C. et. al.: "Miniature Silicon Resonant Pressure Sensor" IEE proceedings D. control theory & Applications, Institution of Electrical Engineers vol. 135, No. 5, Part D, Sep. 1, 1988.

\* cited by examiner

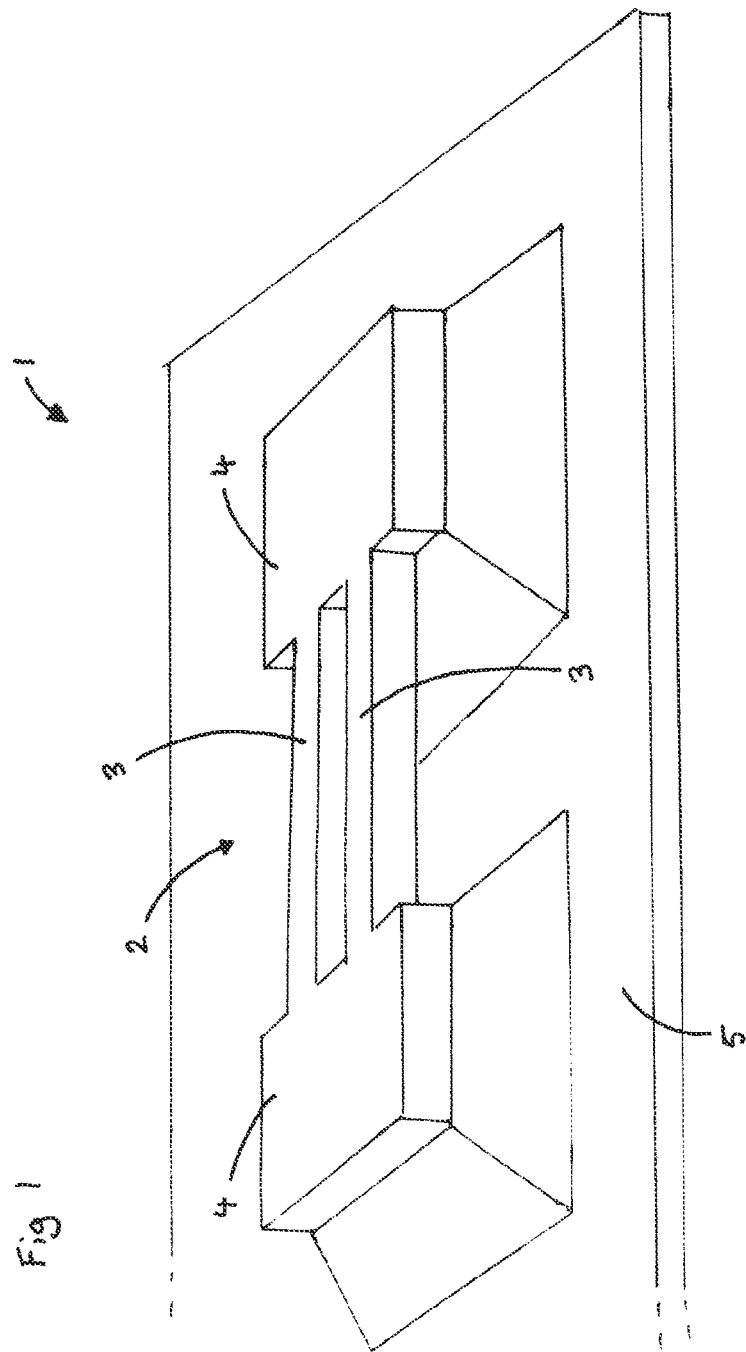

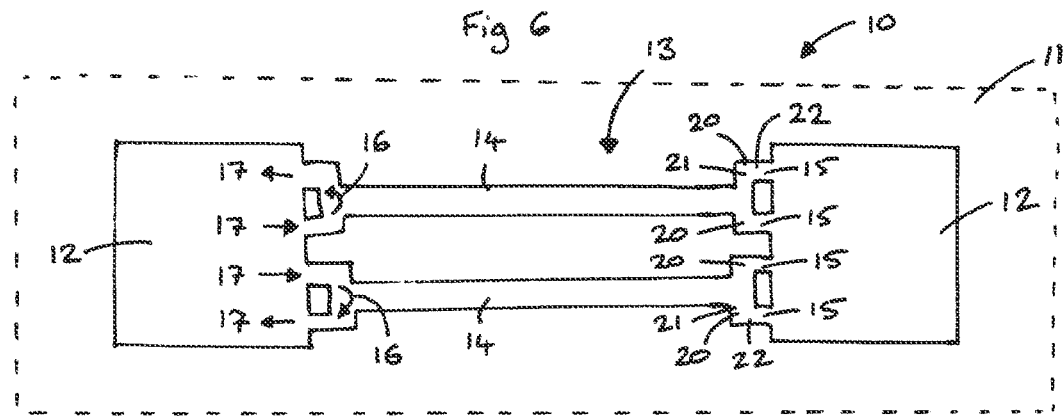
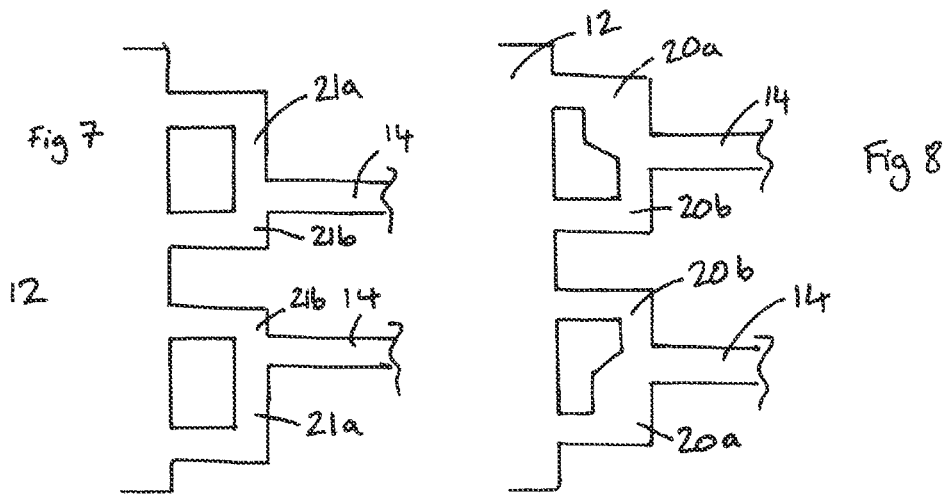
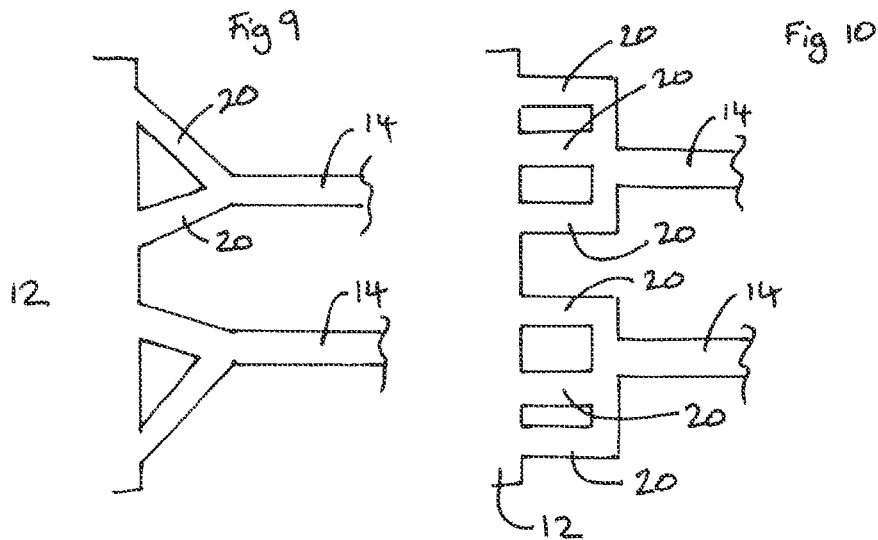

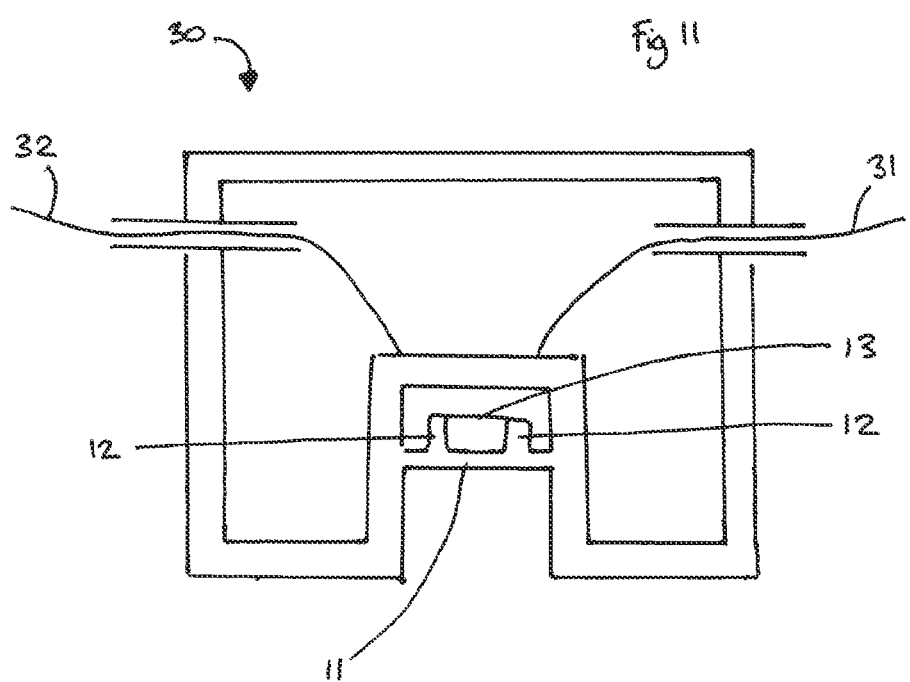

RESONANT SENSOR

CROSS-REFERENCE TO RELATED APPLICATIONS

This is a national stage application under 35 U.S.C. §371 (c) of prior-filed, co-pending PCT patent application serial number PCT/GB2010/0050783, filed on May 13, 2010, which claims priority to a British patent application serial number 0908794.1, filed on May 21, 2009, each of which is hereby incorporated by reference in its entirety.

BACKGROUND OF THE INVENTION

1. Field of the Invention

The present disclosure relates to a sensor, in particular a resonant sensor which may be arranged to measure the pressure of a fluid.

2. Description of Related Art

Resonant sensors have a diaphragm, typically manufactured from silicon, which is exposed to a fluid, the pressure of which is to be measured. Silicon is typically used for the diaphragm as it has a very repeatable elastic behaviour. Variations in pressure of the fluid exposed to the diaphragm cause the diaphragm to flex or deform in accordance with the pressure of the fluid. Resonant sensors are described, for example, in U.S. Pat. Nos. 5,101,664, 5,969,257 and 6,504,864.

FIGS. 1 and 2 illustrate a known resonant pressure sensor 1 comprising a resonator 2, in this example comprising two beams 3 suspended between two pedestals or mesas 4 which are an integral part of a diaphragm 5 to be exposed to a fluid. The resonator 2 is excited to make it vibrate. The flexing of the diaphragm 5 by the pressure applied by the fluid stretches the resonator 2 as shown in exaggerated form for clarity by FIG. 3, altering the frequency at which the resonator vibrates. By measuring the resultant frequency of the stretched resonator, the pressure of the fluid acting against the diaphragm may be inferred.

FIG. 4 is a top view of the resonator showing the vibration of the beams 3 in dashed lines again in exaggerated form for clarity. The beams 3 may be driven by suitable actuators 6, shown schematically in FIG. 4, typically via an AC driving signal. The resonator 2 typically has two beams 3 to make the system symmetrical. However, as shown in FIG. 4, the tops of the mesas 4 are subjected to moments 7 due to the movement of the beams 3 which puts the mesas 4 under stress resulting in them being pushed together due to a net reaction force as shown by dashed lines in FIG. 5. The movement of the mesas 4 towards each other flexes the diaphragm 5 and puts energy into the fluid to be measured reducing the precision of the measurements. Furthermore, the distortion of the diaphragm 5 caused by the moments 7 to which the mesas 4 are subjected also causes distortion of the beams 3 degrading the measurement of the beam position, further reducing the precision of measurements. This reduction in the precision of measurements is of particular concern for low pressure sensors as the distortion of the diaphragm 5 caused by the moments 7 results in a significant transfer of energy from the resonator to the fluid being measured, resulting in a low resonator quality factor leading to reduced sensor accuracy.

BRIEF SUMMARY OF THE INVENTION

It is an aim of embodiments of the present invention to alleviate at least some of the problems discussed above.

According to an embodiment of the present invention there is provided a resonant sensor comprising a diaphragm which may be exposed to a fluid; two supports provided on the diaphragm and a resonator having at least two beams, each beam being suspended between the two supports, wherein each end of each beam is attached to a support at more than one point.

By attaching each end of the beams to a support at more than one point, for example two points, the moments and reaction forces to which the support is subjected may be balanced so that distortion of the support and diaphragm due to vibration of the resonator beams is reduced. Consequently, the resonant sensor is able to provide more precise measurements.

Each beam may be attached to a support by a mounting portion at each of the more than one points and the plurality of mounting portions associated with each beam end preferably have different levels of resilience. The resilience of each mounting member may be tailored to enhance the balancing of reaction forces to which each mesa is subjected, in particular to address greater forces encountered nearer the edge of the side of a support than nearer the middle of the side of a support. The two or more mounting portions associated with the end of each beam may for example be non-symmetrical and may have, for example, one or more of different thicknesses, lengths, configurations and number of attachments and may be made of different types of material.

Further characteristics and advantages of the embodiments of the invention are highlighted by the dependent claims, which form an integral part of the present description.

BRIEF DESCRIPTION OF THE SEVERAL VIEWS OF THE DRAWINGS

Embodiments of the present invention will now be described, by way of example only, with reference to the accompanying drawings in which:

FIGS. 1 to 5 illustrate known resonant sensors;

FIG. 6 illustrates a top view of an embodiment of a resonant sensor according to the present disclosure;

FIGS. 7, 8, 9 and 10 illustrate alternative ways of attaching the ends of each beam of a resonant sensor to a support according to the present disclosure; and FIG. 11 schematically illustrates a sensor housing including an embodiment of the present invention.

DETAILED DESCRIPTION OF THE INVENTION

Figure 4:
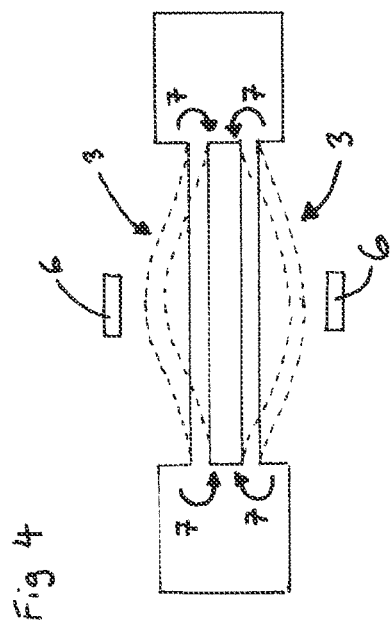
Figure 5:
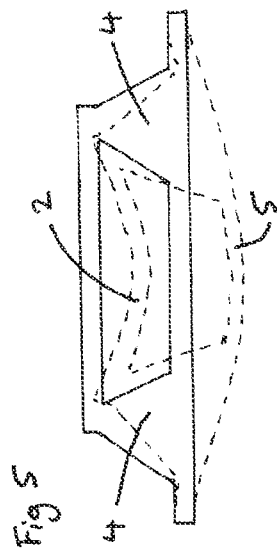
Figure 2:
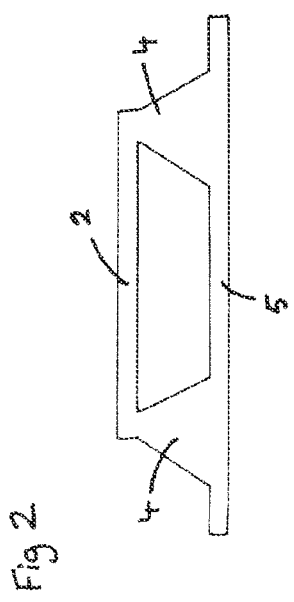
Figure 3:
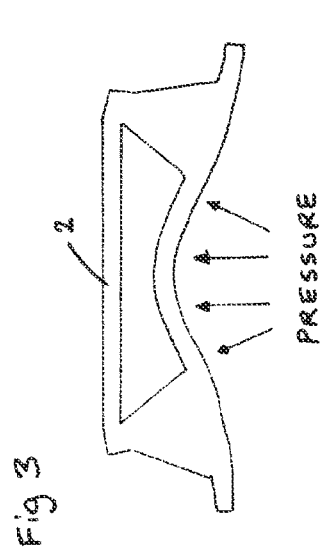

FIG. 6 illustrates a first embodiment of a resonant sensor 10 of the present disclosure. A diaphragm 11, shown by dashed lines is provided to be exposed to a fluid, generally to determine the pressure of the fluid. The diaphragm 11 preferably comprises silicon. The diaphragm 11 is provided with two supports or mesas 12. The mesas 12 are preferably integrally formed on the diaphragm 11. A resonator 13 is suspended between the two mesas 12. In this example, the resonator 13 compresses two beams 14, with the end portion of each beam being attached to a mesa 12 at more than one point, in this example at two points 15. As can be seen from the curved arrows 16 on the left hand side of FIG. 6 illustrating the moments produced by the movement of the beams 14, the overall reaction forces 17 to which each mesa 12 is subjected are balanced. As a result, the tops of the mesas 12 are not distorted, or at least are distorted by a far lesser extent than if the ends of each beam were to be mounted to the mesa 12 at only a single point. Consequently, the mesas 12 undergo far less movement due to the vibration of the beams 14 in use, resulting in the diaphragm 11 being distorted to a far lesser extent due to movement of the beams of the resonator. Consequently, far more precise measurements may be made, which is of particular importance with low pressure sensors where the diaphragm 11 is likely to be most flexible and therefore most significantly affected by unbalanced reaction forces.

In the embodiment shown in FIG. 6, the end portion of each beam 14 has two mounting portions 20. Each mounting portion 20 has a first portion 21 attached to the beam 14 which extends perpendicularly to the length of the beam and a second portion 22 having a length in the same direction as the length of the beam 14 provided between the first portion 21 and the mesa 12.

In the example described in FIG. 6 the mounting portions 20 between the beams 14 and mesas 12 are substantially symmetrical. However, it has been found that the mounting portions 20 nearer to the edge of the side of the mesa 12 are subjected to greater forces and moments than those nearer the middle of the side of the mesa 12. Consequently, the associated mounting portions 20 at each end of a beam 14 preferably have different levels of resilience to balance the different moments encountered at different distances from the middle of the edge of each mesa 12. The associated mounting portions 20 at each end of a beam 14 may be non-symmetrical to provide the appropriate differing levels of resilience.

FIG. 7 illustrates the mounting of two beams 14 to a mesa 12 which is similar to the embodiment of FIG. 6, except that the first perpendicular portions 21a nearer the outer edge of the mesa 12 are made longer than the second perpendicular portions 21b nearer to the middle of the edge of the mesa 12 to enhance the balancing of the reaction forces. The precise ratio of lengths of the first and second perpendicular portions 21a and 21b may be selected as appropriate for each arrangement to enhance the balancing of the reaction forces.

FIG. 8 shows another embodiment of the mounting of the end portion of a beam 14 to a mesa 12 except that in this example the mounting members 20 on each side of the beam 14 have different thicknesses to balance the reaction forces resulting from the mountings at different distances from the middle of the side portion of the mesa 12. In this example the first mounting members 20a nearer the outer edge of the mesa 12 are thicker than the second mounting members 20b nearer to the middle of the edge of the mesa 12 to enhance the balancing of the reaction forces. The precise ratio of thicknesses of the first and second mounting members 20a and 20b may be selected as appropriate for each arrangement to enhance the balancing of the reaction forces.

As will be appreciated by a person skilled in the art, various combinations of non-symmetrical lengths and thicknesses of the mounting members 20 may be used in various examples to enhance the balancing of the reaction forces depending upon the distance at which they are mounted from the middle of the side portion of the mesa 12.

The mounting members 20 do not need to have the perpendicular first portions 21 as shown in FIGS. 6, 7 and 8. For example, as shown in FIG. 9 the mounting members 20 could be provided as straight portions directly between the end of a beam 14 and the side of a mesa 12. In this example the lengths of the straight mounting members 20 are typically at an angle of between 20° and 80° to the side of the mesa 12. The mounting members 20 for each beam end may be at different or the same angles from the axis of the beam 14. As in the previous examples, at least one of the lengths and thicknesses of associated mounting members 20 at the end of a beam 14 may be different from each other to accommodate greater moments nearer to the edge of the side of a mesa 12 than towards the middle.

As shown in FIG. 10 the end of each beam 14 may be mounted to the side of a mesa at three or more points, in this example by three mounting members 20. The end of each beam 14 may be mounted to the side of a mesa 12 by any appropriate number of two or more points. The angle, thickness and length of each mounting member 20 may be selected appropriately in order to balance the reaction forces.

FIG. 11 schematically illustrates an example of a pressure sensor housing 30 to be used with any of the resonant sensors described above. The housing 30 is arranged such that the diaphragm 11 may be exposed to a fluid to be tested. The diaphragm has mesas 12 and a resonator 13 as described above mounted thereon. The housing 30 has an electrical input 31 used to drive the vibration of the beams 14, typically via an AC driving signal using for example an electrostatic comb drive, a magnetic drive, piezoelectric drive or the like as is well known in the art. An electrical output 32 is also provided from which the pressure of the fluid being tested may be inferred using a controller (not shown) for example. The pressure of the fluid is typically inferred by the pressure applied by the fluid flexing the diaphragm 11 which stretches the resonator 13 altering the frequency at which it vibrates. By measuring the resultant frequency, the pressure of the fluid acting against the diaphragm 11 is inferred, typically by an appropriate algorithm or a look up table. The outer side is exposed to pressure with the inner side at vacuum to form an absolute pressure sensor.

Many variations may be made to the examples described above without departing from the scope of the invention. For example, if the end of each beam 14 is mounted to the side of a mesa 12 by mounting means 20 with different levels of resilience, the different mounting means 20 may be made non-symmetrical for example by one or more of different lengths, different thicknesses, differing angles of mounting means 20 or different numbers of attachments for example. The resilience of associated mounting means 20 could also be varied by making them from different materials.

The resonator 13 may have more than two beams 14. However, in practice there would preferably be an even number of beams e.g. two, four, six etc driven in anti-phase to enhance balancing of reaction forces.

By mounting the end of each beam 14 to a mesa 12 at more than one point, the reaction forces applied to the mesa 12 by the vibrating beam 14 can be balanced reducing the distortion of the mesa and therefore also the diaphragm so that more precise pressure measurements may be obtained.

The invention claimed is:

1. A resonant sensor for a fluid, the sensor comprising:
   a diaphragm;
   two supports provided on the diaphragm; and
   a resonator having at least two separated beams, with each beam being suspended between the two supports, wherein each end of each beam is attached to one of the two supports at more than one point.

2. A resonant sensor according to claim 1, wherein each beam is attached to a support by a respective mounting portion at each of the more than one points and each of the mounting portions associated with each beam end has a respective, different level of resilience.

3. The resonant sensor according to claim 2, wherein the mounting portions associated with one of the beam ends are respective, different lengths.

4. The resonant sensor according to claim 2, wherein the mounting portions associated with one of the beam ends have respective, different thicknesses.

5. The resonant sensor according to claim 2, wherein the mounting portions associated with one of the beam ends have a straight portion arranged at an angle of between 20° and 80° to the adjoining side of a mesa of the two supports.

6. The resonant sensor according to claim 2, wherein the mounting portions associated with one of the beam ends are made of respective, different types of material.

7. A resonant sensor for a fluid, the sensor comprising:
a diaphragm; and
two supports provided on the diaphragm and a resonator having at least two beams, with each beam being suspended between the two supports, wherein each end of each beam is attached to one of the supports at more than one point, wherein each beam is attached to one of the supports by a mounting portion at each of the more than one points and the plurality of mounting, portions associated with each beam end have different levels of resilience, and wherein the mounting portions associated with a beam end are non-symmetrical.

8. The resonant sensor according to claim 7, wherein the mounting portions associated with one of the beam ends are respective, different lengths.

9. The resonant sensor according to claim 7, wherein the mounting portions associated with one of the beam ends have respective, different thicknesses.

10. The resonant sensor according to claim 7, wherein the mounting portions associated with one of the beam ends have a straight portion arranged at an angle of between 20° and 80° to the adjoining side of a mesa of the two supports.

11. The resonant sensor according to claim 7, wherein the mounting portions associated with one of the beam ends are made of respective, different types of material.

12. The resonant sensor for a fluid, the sensor comprising:
a diaphragm; and
two supports provided on the diaphragm and a resonator having at least two beams, with each beam being suspended between the two supports, wherein each end of each beam is attached to one of the supports at more than one point, wherein each beam is attached to one of the supports by a mounting portion at each of the more than one points and the plurality of mounting portions associated with each beam end have different levels of resilience, and wherein the mounting portions associated with a beam end have a different number of attachment points.

13. The resonant sensor according to claim 12, wherein the mounting portions associated with one of the beam ends are respective, different lengths.

14. The resonant sensor according to claim 12, wherein the mounting portions associated with one of the beam ends have respective, different thicknesses.

15. The resonant sensor according to claim 12, wherein the mourning portions associated with one of the beam ends have a straight portion arranged at an angle of between 20° and 80° to the adjoining side of a mesa of the two supports.

16. The resonant sensor according to claim 12, wherein the mounting portions associated with one of the beam ends are made of respective, different types of material.

* * * * *

UNITED STATES PATENT AND TRADEMARK OFFICE
CERTIFICATE OF CORRECTION

PATENT NO.         : 8,863,579 B2
APPLICATION NO.    : 13/321191
DATED              : October 21, 2014
INVENTOR(S)        : Kinnell Page 1 of 1

It is certified that error appears in the above-identified patent and that said Letters Patent is hereby corrected as shown below:

In Column 4, Line 55, in Claim 2, delete "A resonant" and insert -- The resonant --, therefor.

In Column 5, Line 13, in Claim 7, delete "mounting, portions" and insert -- mounting portions --, therefor.

Signed and Sealed this
Ninth Day of February, 2016

Michelle K. Lee
*Director of the United States Patent and Trademark Office*